United States Patent
Saikia et al.

(10) Patent No.: US 10,216,837 B1
(45) Date of Patent: Feb. 26, 2019

(54) SELECTING PATTERN MATCHING SEGMENTS FOR ELECTRONIC COMMUNICATION CLUSTERING

(71) Applicant: Google Inc., Mountain View, CA (US)

(72) Inventors: Amitabh Saikia, Mountain View, CA (US); Marc-Allen Cartright, Stanford, CA (US); Luis Garcia Pueyo, San Jose, CA (US); Vanja Josifovski, Los Gatos, CA (US); Jie Yang, Sunnyvale, CA (US); Mike Bendersky, Sunnyvale, CA (US); MyLinh Yang, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 327 days.

(21) Appl. No.: 14/584,905

(22) Filed: Dec. 29, 2014

(51) Int. Cl.
*G06F 17/30* (2006.01)
*G06F 17/00* (2006.01)
(Continued)

(52) U.S. Cl.
CPC ........ *G06F 17/30705* (2013.01); *G06F 17/30* (2013.01); *G06N 5/003* (2013.01); *G06Q 10/107* (2013.01); *G06F 17/3053* (2013.01)

(58) Field of Classification Search
CPC .... G06F 17/30; G06F 17/3053; G06Q 10/107
(Continued)

(56) References Cited

U.S. PATENT DOCUMENTS 6,253,169 B1 6/2001 Apte et al.
7,475,010 B2 1/2009 Chao
(Continued)

FOREIGN PATENT DOCUMENTS

WO 2013082151 6/2013
WO 2013192583 12/2013

OTHER PUBLICATIONS

Black, Julie et al, "Automated Event Extraction from Email," Jun. 2, 2004, (http://nlp.stanford.edu/courses/cs224n/2004/jblack-final-report.pdf ), 12 pages.
(Continued)

*Primary Examiner* — Marcin R Filipczyk
(74) *Attorney, Agent, or Firm* — Middleton Reutlinger (57) ABSTRACT

Methods, apparatus, systems, and computer-readable media are provided for selecting pattern matching segments suitable for electronic communication clustering. A set of pattern matching segments may be identified that match at least one of a corpus of electronic communication addresses. A measure of coverage of each of the set of pattern matching segments across the corpus of electronic communication addresses may be determined. A score associated with each pattern matching segment may be determined based on the measure of coverage and one or more measures of flexibility associated with each of the set of pattern matching segments. One or more of the pattern matching segments may be selected based on the determine scores. A corpus of electronic communications may then be grouped into a plurality of clusters based on a comparison of the one or more selected pattern matching segments to electronic communication addresses associated with the corpus of electronic communications.

10 Claims, 6 Drawing Sheets

(51) Int. Cl.
*G06N 5/00* (2006.01)
*G06Q 10/10* (2012.01)

(58) Field of Classification Search
USPC .......................................... 707/769; 709/203
See application file for complete search history.

(56) References Cited

U.S. PATENT DOCUMENTS

| | | | |
|---|---|---|---|
| 7,496,500 | B2 | 2/2009 | Reed et al. |
| 7,505,984 | B1 | 3/2009 | Nevill-Manning et al. |
| 7,512,605 | B2 | 3/2009 | Spangler |
| 7,660,804 | B2 | 2/2010 | Wen et al. |
| 7,836,012 | B1 | 11/2010 | Nevill-Manning et al. |
| 8,046,226 | B2 | 10/2011 | Sable et al. |
| 8,055,707 | B2 | 11/2011 | Desai et al. |
| 8,082,248 | B2 | 12/2011 | Abouyounes |
| 8,108,206 | B2 | 1/2012 | Hufnagel et al. |
| 8,239,387 | B2 | 8/2012 | Madaan et al. |
| 8,364,467 | B1 | 1/2013 | Bowman et al. |
| 8,386,487 | B1 | 2/2013 | Ben-Artzi et al. |
| 8,458,584 | B1 | 6/2013 | Wilson et al. |
| 8,561,185 | B1 | 10/2013 | Muthusrinivasan et al. |
| 8,583,648 | B1 | 11/2013 | Majkowska |
| 8,589,366 | B1 | 11/2013 | Younes et al. |
| 8,630,989 | B2 | 1/2014 | Blohm et al. |
| 8,775,400 | B2 | 7/2014 | Ickman et al. |
| 8,862,579 | B2 * | 10/2014 | Wissner ............. G06F 17/30864 707/731 |
| 9,154,514 | B1 | 10/2015 | Prakash |
| 9,563,689 | B1 | 2/2017 | Pueyo et al. |
| 9,652,530 | B1 | 5/2017 | Bendersky et al. |
| 2004/0044674 | A1 | 3/2004 | Mohammadioun et al. |
| 2006/0168006 | A1 | 7/2006 | Shannon et al. |
| 2008/0046441 | A1 | 2/2008 | Wen et al. |
| 2009/0012824 | A1 | 1/2009 | Brockway et al. |
| 2009/0214034 | A1 * | 8/2009 | Mehrotra ............. G06Q 10/107 380/255 |
| 2010/0100815 | A1 | 4/2010 | Hutchinson et al. |
| 2010/0179961 | A1 | 7/2010 | Berry et al. |
| 2010/0235367 | A1 | 9/2010 | Chitiveli et al. |
| 2010/0325115 | A1 | 12/2010 | Xu |
| 2011/0106892 | A1 | 5/2011 | Nelson et al. |
| 2011/0131034 | A1 | 6/2011 | Moyle et al. |
| 2011/0219081 | A1 | 9/2011 | Parthasarathy et al. |
| 2012/0005221 | A1 | 1/2012 | Ickman et al. |
| 2012/0005284 | A1 | 1/2012 | Tse |
| 2012/0215853 | A1 | 8/2012 | Sundaram et al. |
| 2012/0254181 | A1 | 10/2012 | Schofield et al. |
| 2012/0254388 | A1 | 10/2012 | Duxbury et al. |
| 2012/0297025 | A1 | 11/2012 | Zeng et al. |
| 2012/0317499 | A1 | 12/2012 | Shen |
| 2013/0117012 | A1 | 5/2013 | Orlin et al. |
| 2013/0138655 | A1 | 5/2013 | Yan et al. |
| 2013/0239016 | A1 | 9/2013 | Adams et al. |
| 2013/0311875 | A1 | 11/2013 | Pappas et al. |
| 2015/0073895 | A1 | 3/2015 | Karnin et al. |
| 2015/0095429 | A1 | 4/2015 | Gaines et al. |
| 2015/0358447 | A1 | 12/2015 | Horling et al. |
| 2016/0119268 | A1 | 4/2016 | Sharp et al. |
| 2016/0357718 | A1 * | 12/2016 | Gelfand ............. G06F 17/2264 |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

Paone, Lauren "Learned Automatic Recognition Extraction of Appointments from Email," 2006 (http://www.seas.upenn.edu/~cse400/CSE400_2005_2006/Paone/paper.pdf), 12 pages.

Walther, Maximilian "Unsupervised Extraction of Product Information from Semi-structured Sources," Computational Intelligence and Informatics (CINTI), 2012 IEEE 13th International Symposium, Nov. 20-22, 2012, 6 pages.

Grigalis, et al., "Using XPaths of Inbound Links to Cluster Template-Generated Web Pages," Department of Information Systems, Vilnius Gediminas Technical University, Lithuania, Computer Science and Information Systems, Oct. 25, 2013, 11(1):111-131.

Hachenberg, Christian et al., "Locality Sensitive Hashing for Scalable Structural Classification and Clustering of Web Documents," CIKM'13 Oct. 27-Nov. 1, 2013, San Francisco, CA, USA, Copyright 2013 ACM 978-1-4503-2263-8/13/10, 10 pages.

Chang, Chia Hui et al., "A Survey of Web Information Extraction Systems," Knowledge and Data Engineering, IEEE Transactions on, vol. 18, No. 10, Oct. 2006, pp. 1411-1428.

Abou-Shoer, Mohamed I. et al, "Extract-Template Modeling and Pattern Recognition in the Assessment of (Cymbopogon Proximus)," American Journal of Analytical Chemistry, vol. 2 No. 4, 2011, pp. 500-510.

Bonomi, Luca et al., "A Two-Phase Algorithm for Mining Sequential Patterns with Differential Privacy," ACM International Conference on Information and Knowledge Management, Oct. 27-Nov. 1, 2013, Burlingame, California, 10 pages.

Chang, Chia-Hui et al., "IEPAD: Information Extraction Based on Pattern Discovery," Proceedings of the 10th International Conference on World Wide Web, 2001, ACM, New York, NY, USA, pp. 681-688.

Kolya, Anup Kumar et al, "A Hybrid Approach for Event Extraction," Polibits (46) 2012, pp. 55-59, ISSN 1870-9044.

* cited by examiner

SELECTING PATTERN MATCHING SEGMENTS FOR ELECTRONIC COMMUNICATION CLUSTERING

BACKGROUND

Business-to-consumer ("B2C") emails and similar communications often may follow more structured patterns than person-to-person emails, with many being created automatically using templates. However, these templates or other workflows for creating B2C communications are not typically made available to entities interested in extracting data from these communications. It may be possible to reverse engineer data extraction templates using a corpus of B2C communications without humans having access to the corpus. For example, the corpus of B2C communications first may be grouped automatically into clusters of similarly-structured communications, e.g., without human intervention. Then, a data extraction template may be generated for each cluster, again without human intervention.

SUMMARY

The present disclosure is generally directed to methods, apparatus, and computer-readable media (transitory and non-transitory) for selecting electronic communication address pattern matching segments (hereinafter "pattern matching segments") suitable for clustering electronic communications into clusters without human intervention or access to those electronic communications. In particular, a set of pattern matching segments and a corpus of electronic communication addresses associated with electronic communications such as B2C emails may be analyzed. One or more pattern matching segments may be selected from the set of pattern matching segments that are suitable for electronic communication clustering. The selected pattern matching segments may be used in some instances to group a corpus of electronic communications into clusters of similarly-structured communications (e.g., B2C emails that likely have similar structure). In various implementations, data extraction templates may then be generated (without human intervention or access) for each cluster to extract nonconfidential transient content from subsequent electronic communications while ignoring confidential transient content or fixed content that is shared among the corpus of electronic communications (e.g., boilerplate). The selected pattern matching segments may additionally or alternatively be used later to select which data extraction template should be applied to extract transient (and nonconfidential) content from a subsequent electronic communication, without human intervention or access. Performing these various operations without providing access to human beings to the electronic communications may, among other things, preserve user privacy and/or security.

In some implementations, a computer implemented method may be provided that includes the steps of: identifying a set of pattern matching segments that match at least one of a corpus of electronic communication addresses; determining a measure of coverage of each of the set of pattern matching segments across the corpus of electronic communication addresses; determining, based on the measure of coverage and one or more measures of flexibility associated with each of the set of pattern matching segments, a score associated with each pattern matching segment; selecting, based on scores associated with the pattern matching segments, one or more of the pattern matching segments; and grouping a corpus of electronic communications into a plurality of clusters based on a comparison of the one or more selected pattern matching segments to electronic communication addresses associated with the corpus of electronic communications.

This method and other implementations of technology disclosed herein may each optionally include one or more of the following features.

In some implementations, the method may include selecting the set of pattern matching segments from a superset of pattern matching segments. In some implementations, the superset of pattern matching segments may include pattern matching segments empirically identified as being suitable for matching electronic communication addresses. In some implementations, the method may further include determining the one or more measures of flexibility associated with each of the set of pattern matching segments based on a pervasiveness of wildcard characters within each pattern matching segment.

In some implementations, the pervasiveness of wildcard characters within each pattern matching segment may be based on a count of wildcard characters within each pattern matching segment relative to a count of fixed text characters within each pattern matching segment, or based on a count of bits used for wildcard characters within each pattern matching segment relative to a count of bits used for fixed text characters within each pattern matching segment.

In some implementations, the one or more measures of flexibility associated with each of the set of pattern matching segments may be determined based on a pervasiveness of fixed text characters within each pattern matching segment. In some implementations, the pervasiveness of fixed characters within each pattern matching segment may be based on a count of fixed characters within each pattern matching segment relative to a count of wildcard characters within each pattern matching segment, or based on a count of bits used for fixed characters within each pattern matching segment relative to a count of bits used for wildcard characters within each pattern matching segment.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above. Yet another implementation may include a system having one or more of a pattern matching segment identification engine, a pattern matching segment application engine, a pattern matching segment ranking engine, and/or an electronic communication grouping engine to perform methods similar to those described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
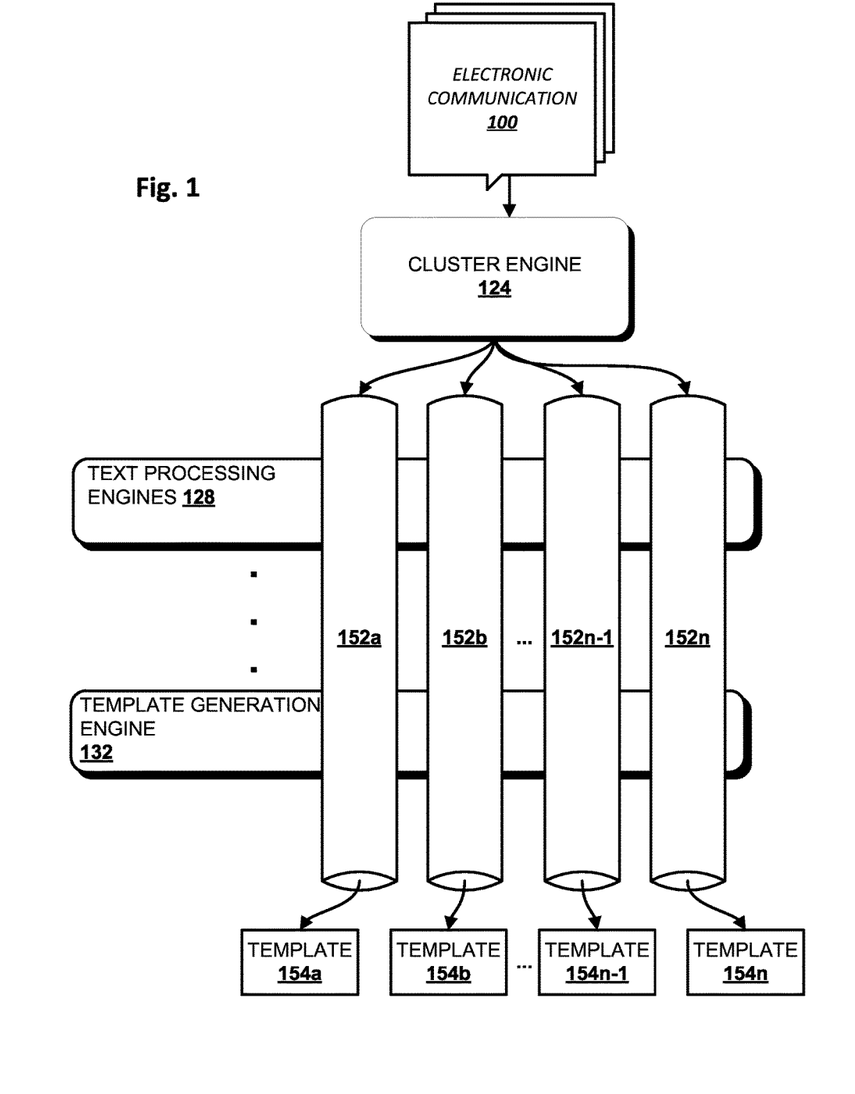
FIG. 1 illustrates an example of how a corpus of electronic communications (e.g., emails, texts) may be analyzed by various components of the present disclosure to generate one or more data extraction templates.

FIG. 1 illustrates an example environment in which a corpus of electronic communications 100 may be grouped into clusters 152a-n, and in which clusters 152a-n of electronic communications may be analyzed to generate data extraction templates 154a-n. As used herein, an "electronic communication" may refer to an email, a text message (e.g., SMS, MMS), an instant message, a transcribed voicemail, or any other textual electronic communication, particularly B2C communications, that are typically (but not always) automatically generated. In various implementations, an electronic communication 100 may include various metadata. For instance, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 124 may be configured to group the corpus of electronic communications 100 into a plurality of clusters 152a-n based on one or more attributes shared among one or more electronic communications 100 within the corpus. In some implementations, cluster engine 124 may have one or more preliminary filtering mechanisms to discard communications that are not suitable for template generation. For example, if a corpus of electronic communications 100 under analysis includes personal emails and B2C emails, personal emails (which may have unpredictably disparate structure) may be discarded. Cluster engine 124 may include various components, examples of which are depicted in FIG. 2, that may cooperate to group B2C and other similar electronic communications into clusters, as will be described below.

Once a corpus of electronic communications are grouped into clusters 152a-n, each cluster may contain electronic communications that are likely to include the same or similar fixed content (e.g., boilerplate), and to have transient content (which may be the primary data of interest for extraction) in approximately the same locations, e.g., structurally (e.g., at the same or similar XPaths), spatially, and/or relative to fixed segments. One or more text processing engines 128 may perform various types of analysis (e.g., natural language processing, annotation, semantic analysis, frequency thresholds, pattern matching, heuristics, machine learning, etc.) to determine and/or annotate portions of electronic communications that are fixed, transient and/or confidential. Based on output of the one or more text processing engines 128, template generation engine 132 may be configured to generate one or more data extraction templates 154a-n. Those data extraction templates 154 may be usable by various components (not depicted) to extract transient, nonconfidential content from one or more subsequent electronic communications without human intervention or access to those electronic communications. As noted above, generating data extraction templates and using those templates to extract data, all without allowing human access to electronic communications, may preserve user security and/or privacy.

Figure 2:
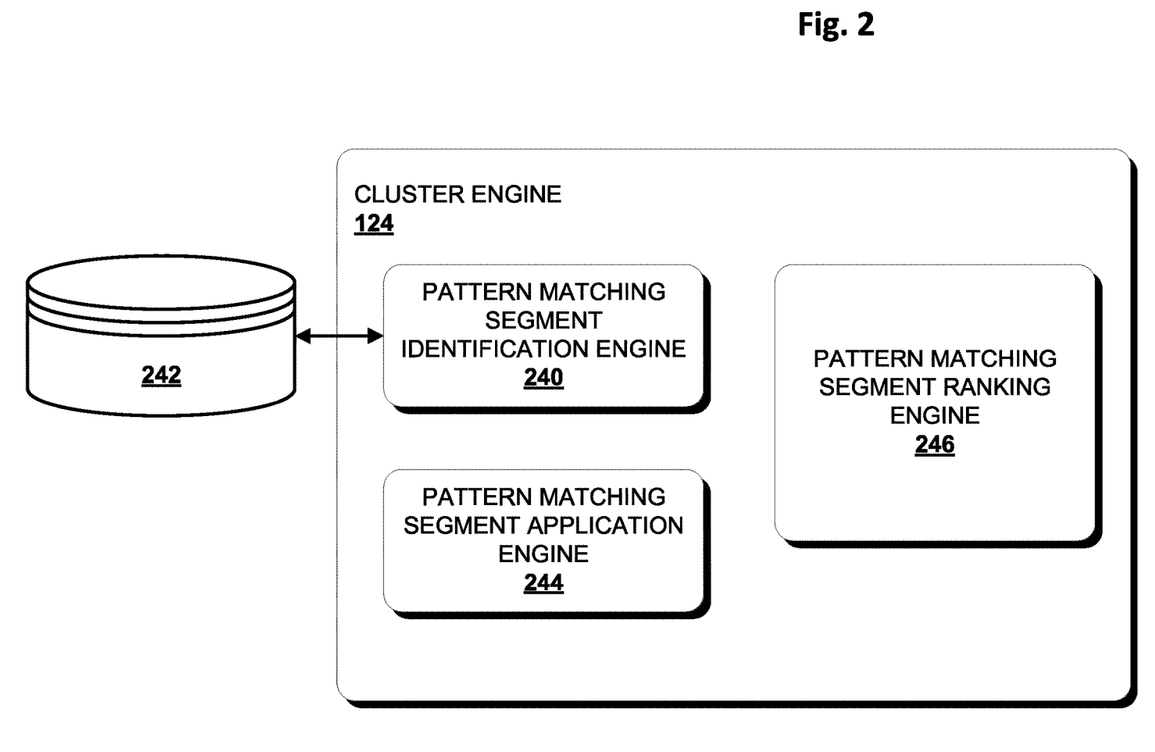
FIG. 2 depicts example components of a clustering engine that may be employed in an environment such as that depicted in FIG. 1, in accordance with various implementations.

FIG. 2 depicts an example of components that may be part of cluster engine 124 and that may cooperate to select one or more electronic communication address pattern matching segments (also referred to herein simply as "pattern matching segments") suitable for grouping electronic communications such as B2C emails into clusters. "Pattern matching segments" may come in various forms, such as regular expressions, bitmasks, and so forth.

A pattern matching segment identification engine 240 may be configured to identify and/or provide a plurality (or superset) of pattern matching segments that may be candidates for use in grouping electronic communications into clusters. In various implementations, a pattern matching segment may include one or more wildcard characters (e.g., "[0-9]," "[A-Za-z]," "*," "+," "," etc.) that may be used to match any textual character, or some subset of textual characters. For example, "." may match any alphanumeric character, whereas "[0-9]" may only match numbers and "[A-Z]" may only match capital letters. Some types of wild card characters indicate a number of characters to be matched. For instance, "." matches zero or more of any alphanumeric character, and ".+" matches one or more of any alphanumeric character. In various implementations, a pattern matching segment may additionally or alternatively include one or more fixed characters that match a specific alphanumeric character.

In some implementations, pattern matching segments may be stored in a pattern matching segment index 242, though this is not required. For example, a set of "known" pattern matching segments may be identified, e.g., empirically, as being suitable generally for matching B2C email addresses, and may be stored in index 242. Pattern matching segment identification engine 240 may access these known pattern matching segments when analyzing a new corpus of electronic communication addresses. In this specification, the term "database" and "index" will be used broadly to refer to any collection of data. The data of the database and/or the index does not need to be structured in any particular way and it can be stored on storage devices in one or more geographic locations. Thus, for example, the index 242 may include multiple collections of data, each of which may be organized and accessed differently.

Pattern matching segment application engine 244 may be configured to compare one or more pattern matching segments to electronic communication addresses of a corpus of electronic communication addresses to determine matches. In some implementations, pattern matching segment application engine 244 may be configured to determine a measure of coverage of pattern matching segments over a corpus of electronic communication addresses. For example, pattern matching segment application engine 244 may determine that one pattern matching segment matches a particular percentage of electronic communication addresses of a corpus, while another pattern matching segment matches a different percentage of the corpus.

Pattern matching segment ranking engine 246 may be configured to determine one or more scores associated with one or more of the pattern matching segments identified by pattern matching segment identification engine 240 in relation to a particular corpus of electronic communication addresses. Pattern matching segment ranking engine 246 may determine scores of pattern matching segments based on various measures, such as measures of flexibility associated with pattern matching segments.

In some implementations, a pattern matching segment may be scored based on its measure of coverage across a corpus of electronic communication addresses. If a pattern matching segment matches no addresses, it may not be suitable for clustering and may receive a low score. However, if a pattern matching segment matches too many addresses, e.g., all the addresses of a corpus, it may also be unsuitable for clustering because subsequent electronic communications grouped into that cluster may be disparate from each other, making data extraction template generation difficult and/or inaccurate. Thus, coverage of a particular pattern matching segment may be compared to one or more thresholds to determine its suitability for use in clustering. In some implementations, these one or more thresholds may be user-adjustable and/or automatically adjusted, e.g., based on a machine learning process.

In some implementations, pattern matching segment ranking engine 246 may determine one or more measures of flexibility associated with each of the set of pattern matching segments based on a pervasiveness of wildcard characters within each pattern matching segment. For example, pattern matching segment ranking engine 246 may determine a count of wildcard characters within each pattern matching segment. In some implementations, this count of wildcard characters may be compared to a count of fixed text characters within each pattern matching segment. In some implementations, pattern matching segment ranking engine 246 may determine a count of bits used for wildcard characters within each pattern matching segment, e.g., in isolation and/or relative to a count of bits used for fixed text characters within each pattern matching segment.

In some implementations, pattern matching segment ranking engine 246 may be configured to determine one or more measures of flexibility associated with each of the set of pattern matching segments based on a pervasiveness of fixed text characters within each pattern matching segment. In some implementations, pattern matching segment ranking engine 246 may determine a count of fixed characters within each pattern matching segment, e.g., in isolation or relative to a count of wildcard characters within each pattern matching segment. In some implementations, pattern matching segment ranking engine 246 may determine a count of bits used for fixed characters within each pattern matching segment, e.g., in isolation and/or relative to a count of bits used for wildcard characters within each pattern matching segment.

In some implementations, pattern matching segment ranking engine 246 may determine, e.g., as a measure of flexibility, a pattern matching segment's so-called "entropy", which may be based on a breadth, count and/or range of characters that may be potentially matched by one or more wildcards of a pattern matching segment. For example, the pattern matching segment [A-Za-z0-9]* has greater entropy than [A-Za-z0-9]{4}, because the latter can match only sequences of four characters, whereas the former can match sequences of any number of characters. As another example, the pattern [A-z] has greater entropy than [A-Z] because the former matches potentially fifty-two different upper or lower case letters, whereas the latter only potentially matches twenty-six upper case letters.

Based on one or more of a pattern matching segment's measure of coverage and/or one or more measures of flexibility associated with the pattern matching segment, pattern matching segment ranking engine 246 may determine a score associated with the pattern matching segment. In this manner, a pattern matching segment's score may be dependent on attributes of the pattern matching segment itself, wholly divorced from any particular corpus of electronic communication addresses, as well as based on the coverage of the pattern matching segment across a particular corpus of electronic communication addresses.

In various implementations, measures of coverage and/or flexibility associated with pattern matching segments may be assigned various weights (e.g., confidences) to affect scores calculated for pattern matching segments. For example, in some implementations, a measure of coverage across a corpus may be weighed more heavily in determining a score of a pattern matching segment than the pattern matching segment's measure(s) of flexibility. Additionally or alternatively, in some implementations, different measures of flexibility (e.g., pervasiveness of wildcard characters, pervasiveness of fixed characters) may be weighed differently, depending on the circumstances.

In some implementations, pattern matching segment ranking engine 246 may score pattern matching segments based at least in part on one or more characteristics shared among electronic communication addresses of a corpus of electronic communication addresses that match the pattern matching segment. For example, in some implementations, an average length (e.g., in bits, characters, etc.) of electronic communication addresses that match a particular pattern matching segment may be taken into account when determining a measure of flexibility or a score of that pattern matching segment. In some implementations, other statistics related to matching electronic communication addresses may be taken into account, such as variance of lengths of matching electronic communication addresses from an average (e.g., standard deviation, etc.).

Pattern matching segment ranking engine 246 may be configured to select pattern matching segments as suitable for use in grouping electronic communications into clusters based on their associated scores. For example, in some implementations, pattern matching segment ranking engine 246 may select one or more pattern matching segments from a set of candidate pattern matching segments (e.g., identified by pattern matching segment identification engine 240) based on their scores satisfying one or more thresholds. Additionally or alternatively, pattern matching segment ranking engine 246 may select pattern matching segments based on their relative ranks.

Engines described herein may be implemented using any combination of hardware and software. In various implementations, operations performed by cluster engine 124, pattern matching segment identification engine 240, pattern matching segment application engine 244, pattern matching segment ranking engine 246, and/or electronic communication grouping engine 248 may be performed on individual computer systems, distributed across multiple computer systems, or any combination of the two. These one or more computer systems may be in communication with each other and other computer systems over one or more networks (not depicted).

Figure 3:
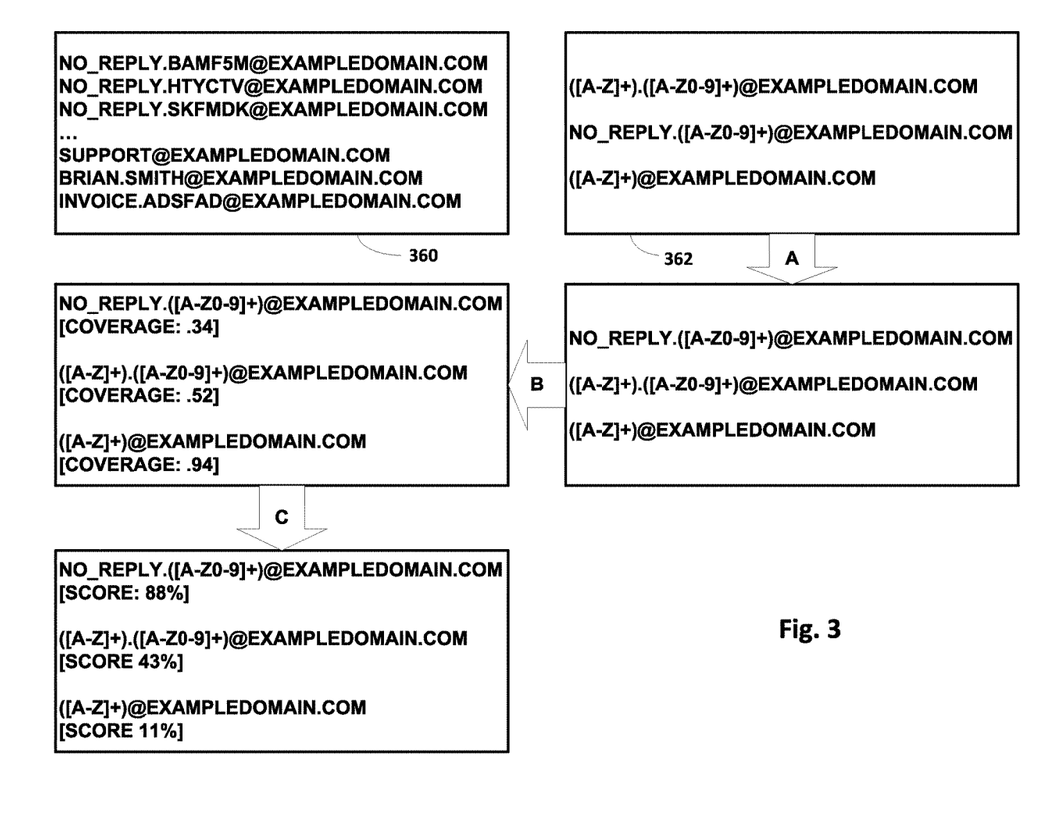
FIG. 3 depicts an example of how a set of electronic communication address pattern matching segments may be constructed using a corpus of electronic communication addresses.

FIG. 3 depicts, at various stages, an example of how a corpus of electronic communications 360 and a set of pattern matching segments 362 may be analyzed to select pattern matching segments suitable for use in clustering electronic communications associated with electronic communication addresses of corpus 360. In this example, corpus 360 includes a plurality of sender email addresses used by a particular entity to send B2C emails. The entity and sender email addresses are associated with a domain, exampledomain.com. Pattern matching segments 362 in this example include prefixes (i.e., text before the "@") that contain some combination of regular expression wildcards and fixed characters. Suffixes of pattern matching segments 362 simply match the domain, "exampledomain.com." While these steps are depicted in a particular order, that is not meant to be limiting. These steps or other steps like them may be performed in other orders, with one or more steps being added or omitted.

In a first step A, the pattern matching segments 362 may be ranked, e.g., by pattern matching segment ranking engine 246, based on one or more measures of flexibility. In this example, the pattern matching segment NO_REPLY.([A-Z0-9]+)@EXAMPLEDOMAIN.COM is ranked higher than ([A-Z]+).([A-Z0-9]+)@EXAMPLEDOMAIN.COM. That may be because the former is somewhat less flexible (and/or has less entropy) than the latter because the former includes more fixed text ("NO_REPLY") than the latter. The same reasoning may be why ([A-Z]+)@EXAMPLEDOMAIN.COM is ranked at the bottom: it potentially has more flexibility/entropy than the other two pattern matching segments because it includes only wildcard characters, whereas the second pattern matching segment includes at least one fixed character (".").

In a second step B, a measure of coverage is determined for each of the pattern matching segments. In this example, the first pattern matching segment is determined, e.g., by pattern matching segment application engine 244, to cover 0.34 (i.e. 34%) of the electronic communication addresses of corpus 360. The second pattern matching segment is determined, e.g., by pattern matching segment application engine 244, to cover 0.52 (i.e. 52%) of the electronic communication addresses of corpus 360. The third pattern matching segment is determined, e.g., by pattern matching segment application engine 244, to cover 0.94 (i.e. 94%) of the electronic communication addresses of corpus 360. In some implementations, pattern matching segments with very high coverages, like the third pattern matching segment with 94% coverage, may be discarded without further analysis because they are not selective enough to yield electronic communications that likely have similar structure.

In a third step C, a score may be determined based on the ranking/measure of flexibility determined at step A and the coverage determined at step B. In this example, the first, second, and third pattern matching segments are assigned scores in the form of percentages (88%, 43% and 11%, respectively), but in other implementations, other types of scores, numeric or otherwise, may be employed. Additionally or alternatively, the pattern matching segments may simply be re-ranked based on their scores, as opposed to only on their measures of flexibility as in step A.

In various implementations, pattern matching segment ranking engine 246 may select one or more pattern matching segments for use in clustering electronic communications based on various criteria. In some implementations, pattern matching segment ranking engine 246 may only select pattern matching segments with scores that satisfy some sort of threshold (e.g., between 30% and 60%). In some implementations, pattern matching segment ranking engine 246 may select the N pattern matching segments having the N highest scores.

Figure 4:
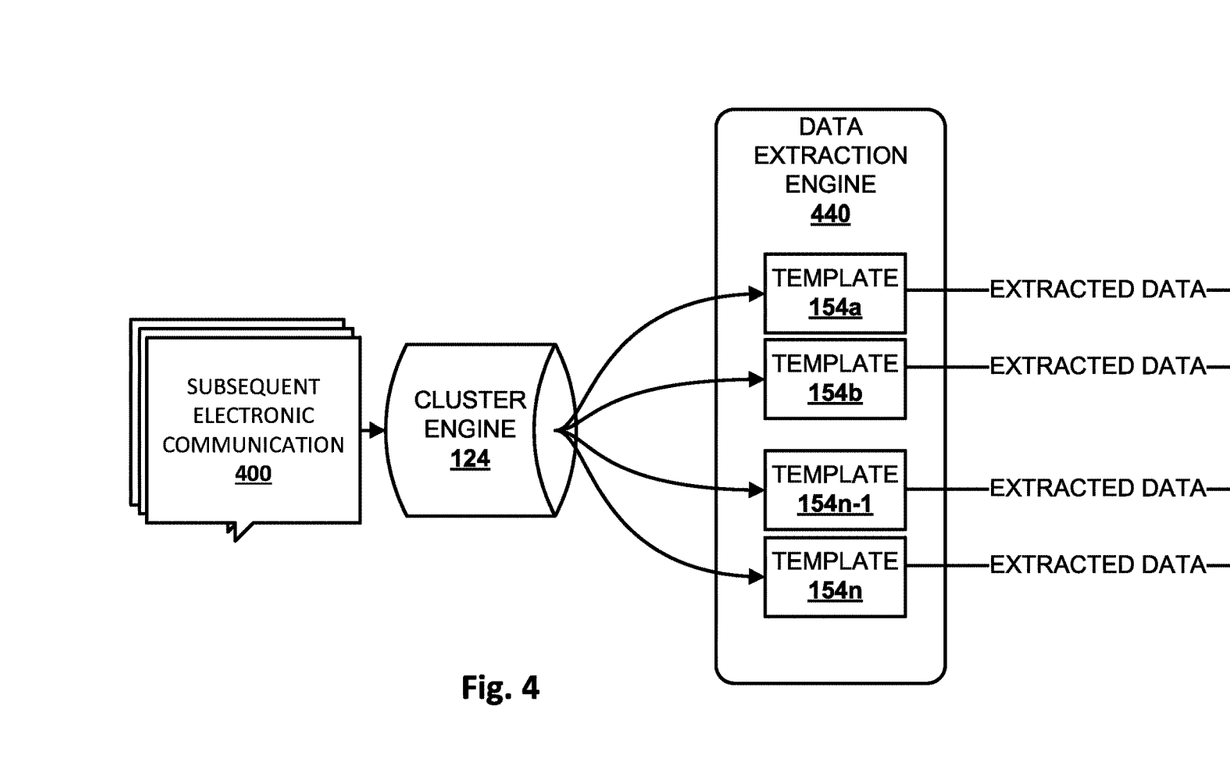
FIG. 4 illustrates an example of how data may be extracted from a subsequent electronic communication using one or more data extraction templates selected using disclosed techniques.

FIG. 4 depicts an example of how subsequent electronic communications 400 may be analyzed after a plurality of data extraction templates 154a-n have been generated. Cluster engine 124 may be configured to employ techniques similar to those described above to determine with which cluster electronic communications 400 should be associated. For example, pattern matching segment application engine 244 (see FIG. 2) of cluster engine 124 may be configured to utilize pattern matching segments selected by pattern matching segment ranking engine 246 to identify clusters into which subsequent electronic communications 400 would be grouped based on electronic addresses associated with the subsequent electronic communications.

Based on the decision of cluster engine 124, a data extraction engine 440 may select and apply a data extraction template (e.g., one of 154a-n) to the electronic communication to extract the appropriate data. For example, data extraction engine 440 may utilize a particular template 154 to extract transient, nonconfidential content from the electronic communication 400. Data extraction engine 440 may likewise ignore or discard confidential and/or fixed content. In various implementations, data extraction engine 440 may perform this extraction without human intervention and/or human access to electronic communications.

While example implementations described herein have for the most part utilized source electronic communication addresses (e.g., sender email addresses) to group electronic communications into clusters and/or to select data extraction templates to apply to subsequent electronic communications, this is not meant to be limiting. In various implementations, other types of electronic communication addresses may be used instead. For example, emails could be clustered and/or matched to data extraction templates based on one or more recipient addresses, including cc and bcc addresses.

Figure 5:
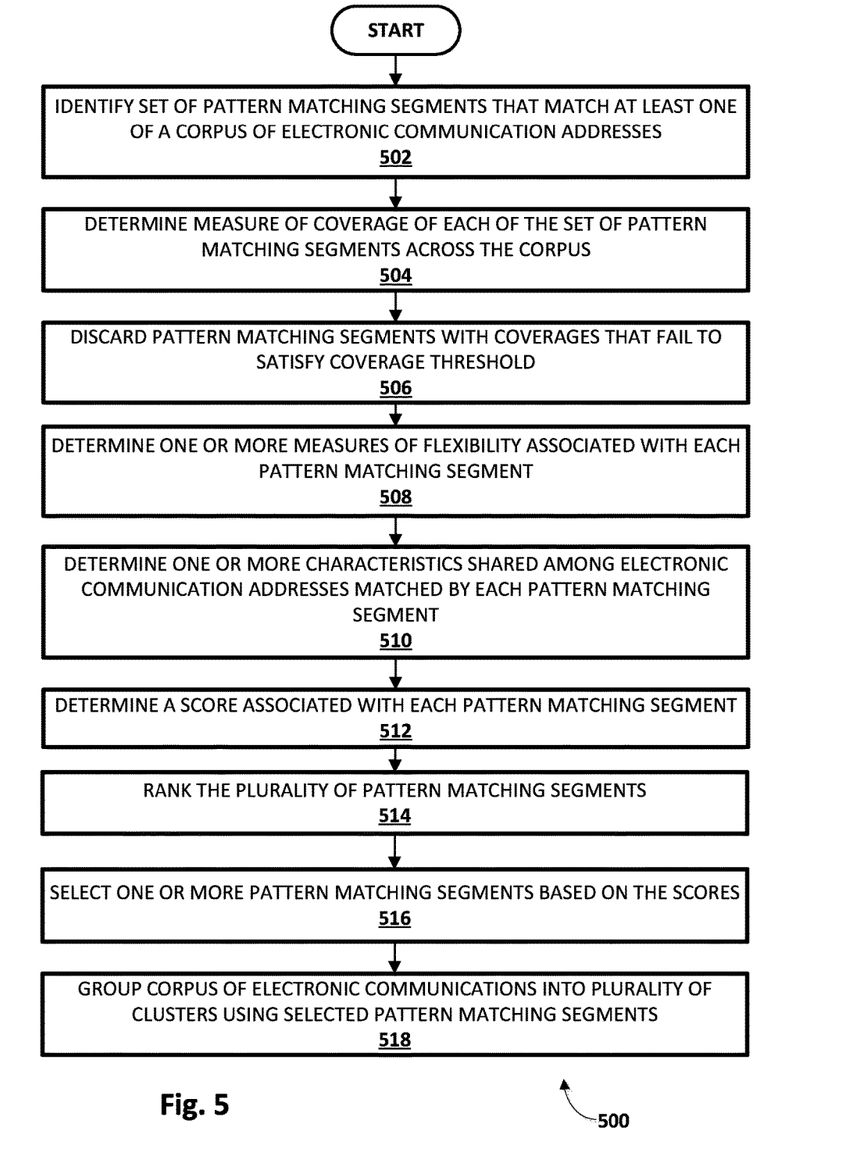
FIG. 5 depicts a flow chart illustrating an example method of selecting pattern matching segments suitable for clustering electronic communications.

Referring now to FIG. 5, an example method 500 of selecting pattern matching segments suitable for clustering electronic communications in a data extraction template generation operation is described. For convenience, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system may identify a set of pattern matching segments that match at least one of a corpus of electronic communication addresses. For example, in some implementations, a superset of pattern matching segments may be stored, e.g., in index 242. In some implementations, the superset of pattern matching segments may be generated using empirical analysis. For example, a plurality of electronic communication addresses (e.g., B2C email addresses) may be analyzed to identify commonalities and/or patterns among the addresses. Regular expressions (or other types of pattern matching segments) may be generated based on those identified commonalities and/or patterns. However the superset of pattern matching segments is determined, the system may test these pattern matching segments against a particular corpus of electronic communication addresses to identify pattern matching segments that match at least one electronic communication address, and to discard or otherwise disregard other pattern matching segments of the superset.

At block 504, the system may determine a measure of coverage of each of the set of identified pattern matching segments across the corpus of electronic communication addresses. As explained above, the measure of coverage for a particular pattern matching segment may be an indication of how many electronic communication addresses of the corpus match the pattern matching segment. At block 506, the system may discard or otherwise disregard pattern matching segments that fail to satisfy one or more coverage thresholds. For example, in some implementations, the system may discard/disregard pattern matching segments with measures of coverage, C, that are outside of a particular range, such that only pattern matching segments with x<C<y are considered suitable for use in electronic communication clustering At block 508, the system may determine one or more measures of flexibility associated with each pattern matching segment of the set of pattern matching segments. In some implementations, particularly those in which the superset of pattern matching segments described above is predetermined, the system may determine measures of flexibility ahead of time, so that this step merely includes looking up those measures of flexibility, e.g., in index 242. In some implementations, the system may determine measures of flexibility associated with pattern matching segments "on the fly." For example, at block 510, the system may determine one or more characteristics shared among electronic communication addresses matched by each pattern matching segment (e.g., average length, standard deviation of lengths, etc.). These characteristics may be considered by the system in determining one or more measures of flexibility associated with the pattern matching segment at block 508. Suppose a particular pattern matching segment matches a plurality of electronic communication addresses with lengths (e.g., in characters, bytes or bits) that have a particular standard deviation, indicating that there is a particular amount of variance or dispersion from an average length of those electronic addresses. This standard deviation (or other similar statistics) may be used as a measure of flexibility. Pattern matching segments that match groups of electronic communication addresses with relatively high standard deviations may be considered more flexible (or to have higher entropy) than pattern matching segments that match groups of electronic communication addresses with lower standard deviations.

At block 512, the system may determine a score associated with each pattern matching segment of the set of pattern matching segments. As noted previously, the system may determine the score for each pattern matching segment based on a variety of measures, such as the measures of coverage determined at block 504, one or more measures of flexibility determined at block 508, and/or one or more characteristics shared among electronic communication addresses matched by the pattern matching segment. The score may take various forms, such as a numeric value or a ranking (e.g., determined at block 514) among other pattern matching segments.

At block 514, the system may optionally rank the set of pattern matching segments based on one or more measures of coverage, flexibility, or overall scores associated with the pattern matching segments. At block 516, the system may select one or more pattern matching segments for use in grouping electronic communications into clusters based on the scores. In some implementations, the system may select all pattern matching segments having a score that satisfies a particular threshold. In some implementations where the system has ranked the pattern matching segments, the system may select the top N pattern matching segments.

At optional block 518, the system may group a corpus of electronic communications (e.g., emails, texts, etc.) into a plurality of clusters using the pattern matching segments selected at block 516. Though not depicted in FIG. 5, the system may then a generate data extraction template for each cluster, e.g., as demonstrated in FIG. 1. In some implementations, the system may later use the same pattern matching segments selected at 516 to determine which generated data extraction templates should be used to extract data from subsequent electronic communications.

Figure 6:
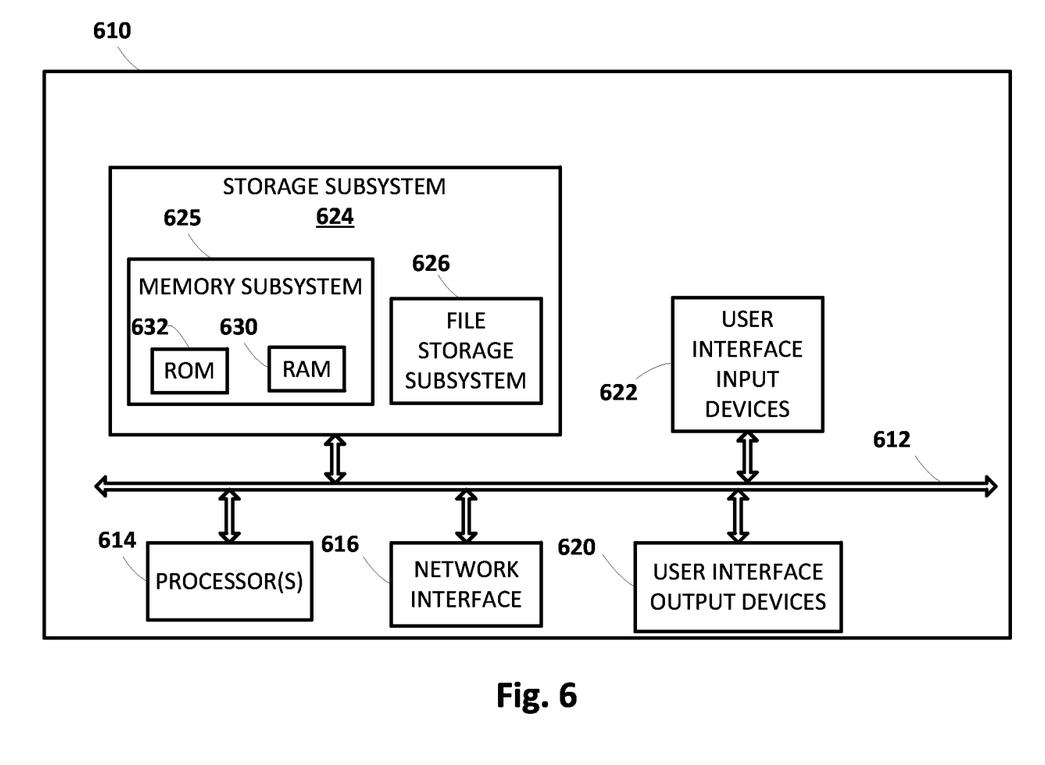
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500 and/or to implement one or more of cluster engine 124, one or more text processing engines 128, template generation engine 132, pattern matching segment identification engine 240, pattern matching segment application engine 244, pattern matching segment ranking engine 246, electronic communication grouping engine 248, and/or data extraction engine 440.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system comprising one or more processors operably coupled with non-transitory memory that stores instructions that, in response to execution of the instructions by the one or more processors, cause the one or more processors to:
    identify a set of pattern matching segments that match at least one of a corpus of email addresses;
    determine a measure of coverage of each of the set of pattern matching segments across the corpus of email addresses;
    determine one or more measures of flexibility associated with each of the set of pattern matching segments based on a count of wildcard characters within each pattern matching segment relative to a count of fixed text characters within each pattern matching segment;
    determine, based on the measure of coverage and the one or more measures of flexibility associated with each of the set of pattern matching segments, a score associated with each pattern matching segment;
    select, based on scores associated with the pattern matching segments, one or more of the pattern matching segments that satisfy one or more thresholds that are automatically adjusted;
    group a corpus of emails into a plurality of clusters based on a comparison of the one or more selected pattern matching segments to email addresses associated with the corpus of emails;
    analyze emails of a given cluster of the plurality of clusters grouped based on a given pattern matching segment to identify content that is transient among the emails of the given cluster;
    generate, for the given cluster, a data extraction template that is usable to extract transient content from subsequent emails that include sender email addresses that match the given pattern matching segment; and
    apply the data extraction template to a subsequent email having a sender address that matches the given pattern matching segment to extract transient data from a subject or body of the subsequent email, wherein the extracted transient data is output to a user via an output device of a computing device operated by the user.

2. The system of claim 1, further comprising instructions to select the set of pattern matching segments from a superset of pattern matching segments.

3. The system of claim 2, wherein the superset of pattern matching segments comprises pattern matching segments empirically identified as being suitable for matching email addresses.

4. The system of claim 1, wherein the set of pattern matching segments comprise regular expressions.

5. The system of claim 1, further comprising instructions to disregard a pattern matching segment of the set of pattern matching segments that fails to satisfy one or more coverage thresholds.

6. The system of claim 1, further comprising instructions to determine the score associated with each pattern matching segment based on one or more characteristics shared among email addresses of the corpus of email addresses that match the pattern matching segment.

7. A computer-implemented method, comprising:
    identifying a set of pattern matching segments that match at least one of a corpus of sender email addresses;
    determining a measure of coverage of each of the set of pattern matching segments across the corpus of sender email addresses;
    determining one or more measures of flexibility associated with each of the set of pattern matching segments based on a count of wildcard characters within each pattern matching segment relative to a count of fixed text characters within each pattern matching segment;
    determining, based on the measure of coverage and the one or more measures of flexibility associated with each of the set of pattern matching segments, a score associated with each pattern matching segment;

selecting, based on scores associated with the pattern matching segments, one or more of the pattern matching segments that satisfy one or more thresholds that are automatically adjusted;

grouping a corpus of emails into a plurality of clusters based on a comparison of the one or more selected pattern matching segments to sender email addresses associated with the corpus of emails;

analyzing emails of a given cluster of the plurality of clusters grouped based on a given pattern matching segment, wherein the analyzing includes identifying content that is transient among the emails of the given cluster;

generating, for the given cluster, a data extraction template that is usable to extract transient content from subsequent emails that include sender email addresses that match the given pattern matching segment; and applying the data extraction template to a subsequent email having a sender address that matches the given pattern matching segment to extract transient data from a subject or body of the subsequent email, wherein the extracted transient data is output to a user via an output device of a computing device operated by the user.

8. The computer-implemented method of claim 7, wherein the identifying comprises selecting the set of pattern matching segments from a superset of pattern matching segments.

9. The computer-implemented method of claim 8, wherein the superset of pattern matching segments comprises pattern matching segments empirically identified as being suitable for matching email addresses.

10. At least one non-transitory computer-readable medium comprising memory that stores instructions that, in response to execution of the instructions in the memory by one or more processors of a computing system, cause the one or more processors to perform the following operations:

identifying, from a superset of pattern matching segments, a set of pattern matching segments that match at least one of a corpus of email addresses;

determining a measure of coverage of each of the set of pattern matching segments across the corpus of email addresses;

determining one or more measures of flexibility associated with each of the set of pattern matching segments based on a count of wildcard characters within each pattern matching segment relative to a count of fixed text characters within each pattern matching segment;

determining, based on the measures of coverage and flexibility, a score associated with each of the set of pattern matching segments;

selecting, based on scores associated with the pattern matching segments, one or more of the pattern matching segments that satisfy one or more thresholds that are automatically adjusted;

grouping a corpus of emails into a plurality of clusters based on a comparison of the one or more selected pattern matching segments to sender email addresses associated with the corpus of emails;

analyzing emails of a given cluster of the plurality of clusters grouped based on a given pattern matching segment, wherein the analyzing includes identifying content that is transient among the emails of the given cluster;

generating, for the given cluster, a data extraction template that is usable to extract transient content from subsequent emails that include sender email addresses that match the given pattern matching segment; and applying the data extraction template to a subsequent email having a sender address that matches the given pattern matching segment to extract transient data from a subject or body of the subsequent email, wherein the extracted transient data is output to a user via an output device of a computing device operated by the user.

\* \* \* \* \*